US006626157B2

(12) United States Patent
Perry

(10) Patent No.: US 6,626,157 B2
(45) Date of Patent: Sep. 30, 2003

(54) APPARATUS AND METHOD TO DETECT FUEL LEAK IN A ZERO-VAPOR FUEL SYSTEM

(75) Inventor: Paul D. Perry, Chatham (CA)

(73) Assignee: Siemens Canada Limited, Ontario (CA)

(*) Notice: Subject to any disclaimer, the term of this patent is extended or adjusted under 35 U.S.C. 154(b) by 116 days.

(21) Appl. No.: 09/768,259

(22) Filed: Jan. 25, 2001

(65) Prior Publication Data

US 2001/0032624 A1 Oct. 25, 2001

Related U.S. Application Data

(60) Provisional application No. 60/178,566, filed on Jan. 26, 2000.

(51) Int. Cl.[7] .............................................. F02M 37/04
(52) U.S. Cl. ................................... 123/516; 123/198 D
(58) Field of Search ............................... 123/516, 518, 123/519, 520, 521, 198 D

(56) References Cited

U.S. PATENT DOCUMENTS

| 3,347,406 A | 10/1967 | Katzenmeyer |
| 3,477,611 A | 11/1969 | Niles |
| 3,617,034 A | 11/1971 | Skinner |
| 3,747,800 A | 7/1973 | Viland |
| 3,752,355 A | 8/1973 | Weissenbach |
| 3,949,720 A | * 4/1976 | Zipprich et al. ............. 123/516 |
| 3,968,896 A | 7/1976 | Giacoletti et al. |
| 3,977,379 A | 8/1976 | Weissenbach |
| 5,056,493 A | 10/1991 | Holzer |
| 5,596,971 A | 1/1997 | Kidokoro |
| 5,722,374 A | 3/1998 | Kidokoro et al. |
| 5,746,185 A | 5/1998 | Kidokoro et al. |
| 5,868,120 A | 2/1999 | Van Wetten et al. |
| 5,913,451 A | 6/1999 | Madison |
| 5,925,817 A | 7/1999 | Kidokoro et al. ............. 73/40 |
| 5,975,331 A | 11/1999 | Ishikawa |

FOREIGN PATENT DOCUMENTS

EP          0 875 414          11/1998

* cited by examiner

Primary Examiner—Carl S. Miller

(57) ABSTRACT

A fuel delivery system of an automobile that eliminates the vapor canister and includes leak detection of the fuel tank while also permitting failsafe operation when there is a leak in the fuel tank. The fuel tank includes a flexible member defining a first chamber that stores fuel in a chamber devoid of air while a second chamber is at ambient pressure. The fuel system can be formed as a module for installation or retrofitting to various applications using an internal combustion engine, including automobiles. A method of operating the fuel system to purge fuel vapor is also disclosed. A method of preventing fuel leaks is additionally disclosed.

18 Claims, 3 Drawing Sheets

APPARATUS AND METHOD TO DETECT FUEL LEAK IN A ZERO-VAPOR FUEL SYSTEM

PRIORITY BENEFITS

This application claims the benefits of provisional application S. No. 60/178,566, filed on Jan. 26, 2000.

BACKGROUND OF THE INVENTION

It is believed that examples of known fuel systems use a bladder to reduce fuel vapor build up within a fuel tank.

It is believed that examples of fuel systems in compliance with fuel emission laws use a bladder and check valves to vent the fuel vapor to a charcoal canister.

It is believed that other examples of fuel systems control the rate of evaporative emission to the charcoal canister by sensing the vapor pressure buildup in a fuel tank.

It is believed that still other examples of fuel systems control the rate of fuel vapor build up by pressurizing a bladder of a fuel tank to attenuate the formation of fuel vapor.

It is believed that the anticipated usage of alcohol based fuels such as methanol or alcohol in the future will require a more reliable and robust fuel system to prevent emission of vapor and fuel.

SUMMARY OF THE INVENTION

According to the present invention, a fuel delivery system can purge fuel vapor without the use of a charcoal vapor canister. According to one embodiment of the present invention, a failsafe fuel tank is provided. According to yet another embodiment, a fuel module to detect and prevent leakage of fuel vapor or liquid is provided. According to another embodiment of the present invention, a method is provided to detect fuel leaks and to prevent the leakage of fuel.

The present invention provides a fuel delivery system to an internal combustion engine. The fuel delivery system comprises an internal combustion engine; an emission computer; and a fuel tank. A flexible membrane is disposed within the fuel tank, the membrane separating a first chamber and a second chamber. A fuel pump being coupled to one of the first and second chambers, the fuel pump adapted to supply fuel to the internal combustion engine. A first valve communicates with at least one of the first and second chambers, the first valve assembly adapted to vent air from one of the first and second chambers when fuel is pumped into or out of the fuel tank. A second valve in communication with the other one of the first and second chambers, the second valve adapted to purge air and fuel vapors without a charcoal canister during an operation of the engine; a sensor is disposed within one of the first and second chambers and connected to the emission computer, wherein the sensor is responsive to the presence of air in one of the first and second chambers.

The present invention further provides a fuel storage module. The fuel storage module comprises a first container with at least one open end; a second container with at least one open end. A flexible membrane being disposed between the open ends of the respective first container and the second container. A fuel pump being coupled to one of the first and second containers. A first valve communicates with at least one of the first and second containers. A second valve communicates with the other one of the first and second containers, and the second valve not in communication with a charcoal vapor canister. A sensor is disposed within one of the first and second containers, wherein the sensor senses the presence of air in one of the containers.

The present invention additionally provides for a fuel vapor control system for an internal combustion engine. The system comprises a fuel tank; a flexible member being disposed within the fuel tank, the member separating a first compartment and a second compartment; a fuel pump being coupled to one of the first and second compartments; a first valve communicating with at least one of the first and second chambers; a second valve communicating with the other one of the first and second chambers and in further communication with a vacuum source, the second valve not in communication with a vapor canister; and a sensor being disposed within one of the first and second chambers, wherein the sensor is a liquid-air discriminator.

The present invention also provides for a method of determining leaks in a fuel tank. The method comprises providing fuel in a storage volume in the absence of air, and detecting an entry of air in the fuel storage volume.

The present invention further provides for a method of operating a fuel-vapor purge system. The vapor system includes a fuel storage chamber and an air chamber in a fuel tank. The method comprises providing fuel to the storage chamber to allow the formation of fuel vapors in the fuel storage chamber; expelling air and fuel vapors in the storage chamber without communicating to a charcoal vapor canister; and sensing the entry of air into the fuel storage chamber.

The present invention additionally provides for a failsafe method of retaining fuel within a fuel tank. The fuel tank includes a fuel storage chamber and an air chamber. The method comprises depressurizing the fuel storage chamber to a pressure lower than ambient air pressure; preventing air from venting out of the air chamber; and retaining fuel in the storage chamber upon a rupture of the fuel storage chamber that allows outside air to enter the storage chamber.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain features of the invention.

DETAILED DESCRIPTION OF THE PREFERRED EMBODIMENT

Figure 1:
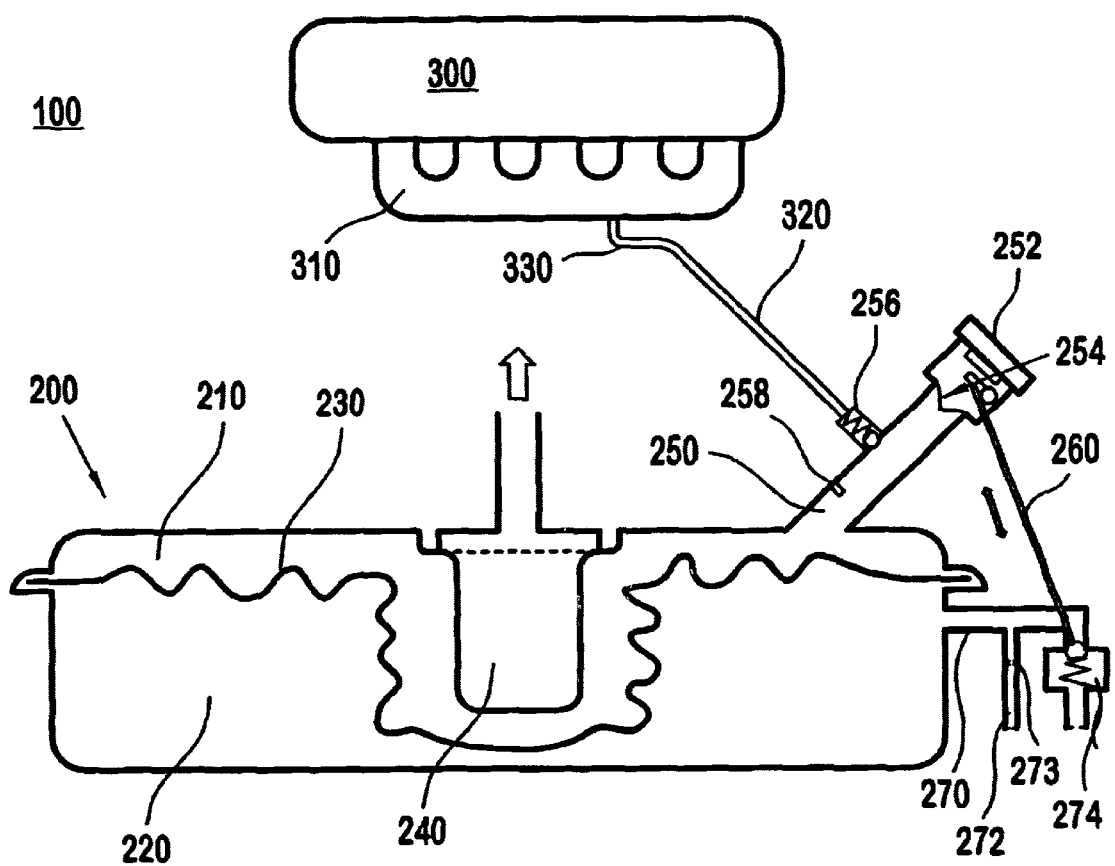
FIG. 1 is a cross-sectional view of a fuel system according to the present invention.

Referring initially to FIG. 1, a fuel delivery system 100 is shown that includes a fuel tank or module 200, and an internal combustion engine 300. Preferably, the system 100 is provided in an automobile (not shown). However, the fuel delivery system 100 may be employed in any suitable device requiring the use of an internal combustion engine. The fuel tank 200 is formed of a first chamber 210 and a second chamber. Disposed between the first chamber 210 and the second chamber 220 is a flexible membrane or member 230 that divides the two chambers.

The flexible member 230 can be a polymer which includes polyethylene, nylon, polypropylene, polyamide, polyester or preferably a kevlar-polymer composite. To ensure optimum operation when the fuel pump 240 is dispensing fuel, the flexible member 230 can include preformed creases or folds on the surface of the flexible member 230.

The first and second chambers can be plastic or metal and are affixed together by conventional techniques such as welding, bonding, laser welding, or preferably snapped or crimped together.

One of the first and second chambers can store fuel while the other chamber can store atmospheric air at ambient pressure. Fuel is pumped from the fuel pump 240 disposed in the first chamber 210 to the fuel injectors (not shown). Although an in-tank fuel pump 240 is shown, an external fuel pump can also be used. The first chamber 210 can also include a nozzle portion 250. The nozzle portion 250 includes a nozzle cap 252, a first one-way valve 256 and a sensing device 258. As will be discussed later, the nozzle portion 250 also includes a device 260 interlocking the nozzle portion 250 to the second chamber 220.

The nozzle portion 250 also includes a one-way sealing device that can be a dry-break seal or preferably lip seals 254. The lip seals 254 can include polytetraflouroethylene (PTFE) seals that prevents the escape of fuel vapor when a refueling probe 400 is inserted into the nozzle portion 250.

The one-way valve 256 allows the communication of an intake manifold 310 with the nozzle portion 250 when a predetermined pressure differential exists between the nozzle portion 250 and the intake manifold 310. The one-way valve 256 is preferably disposed adjacent the nozzle portion 250 for reasons that will be explained later. A vapor passage 320 is disposed between the intake manifold 310 and the one way valve 256. The vapor passage 320 preferably includes an orifice portion 330 disposed between the manifold 310 and the nozzle portion 250. Where the end user's applications require a more precise regulation of fuel vapor control, the one way valve 256 can be a normally closed solenoid valve.

The sensing device 258 is disposed in the nozzle portion 250 and can sense a plurality of physical parameters, including air and liquid. The parameters can also include pressure. The sensing device 258 can be a liquid-air sensor applicable in a fuel tank environment or a conventional pressure sensor. The sensing device 258 can be connected to an electronic control unit (not shown) or to a signaling device (not shown). The detection of one of the parameters allows an electronic control unit (not shown) to determine fuel leaks or even the approximate fuel volume without the use of a conventional fuel level sensor, that is, by correlating the pressure acting on the flexible member 230 while considering temperature changes to be negligible.

Because the volume of air in the second chamber 220 can change, the second chamber 220 includes a vent passage 270 to facilitate egress and ingress of ambient air. A bleed passage 272 and a controllable one-way valve 274 communicate with the second chamber 220 through the air passage. The second chamber 220 communicates with ambient air through a throttled portion 273 of the bleed passage 272. The egress of air from the second chamber 220 can be done through a selectively controllable one-way valve 274. Again, the one-way valve 274 can be replaced with a normally closed solenoid valve (not shown) to permit a more precise control of air pressure in the second chamber 220.

Figure 2:
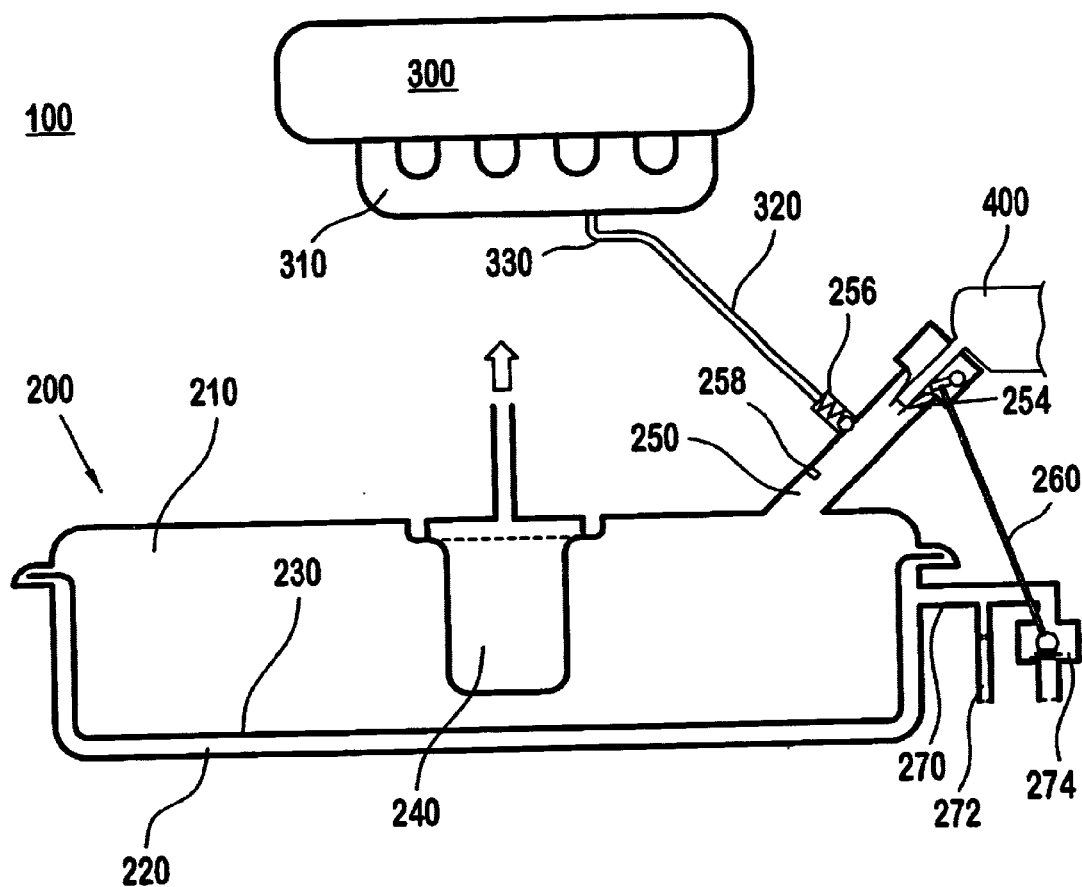
FIG. 2 is a cross-sectional view of the fuel system shown in FIG. 1 being refueled.

The interlocked operation of the nozzle portion 250 and the controllable one-way valve 274 of the second chamber 220 will be discussed next. As shown in FIGS. 1 and 2, a linkage device 260 can be disposed between the nozzle portion 250 and the one-way valve 274. When the fuel tank 200 is not being refueled, the linkage device 260 is not interlocked to the controllable one-way valve 274, permitting the one-way valve to function as a normally closed one-way valve. Upon the insertion of a refueling probe 400, as shown in FIG. 2, the controllable one-way valve 274 is opened via the linkage device 260 to allow the second chamber 220 to communicate with ambient air. Although the interlock device 260 is shown as a linkage, the linkage can be a cable type mechanism or the linkage and the one way valve can be replaced with a solenoid (not shown) and a nozzle cap switch (not shown). The one-way solenoid valve, as noted above, can be electronically interlocked with a nozzle cap switch such that the solenoid is responsive to the nozzle cap switch to open the normally closed one-way valve 274.

An electronic control unit (not shown) can control the internal combustion engine 300. The electronic control unit can also be integrated with a control unit (not shown) of various emission-control devices of the internal combustion engine 300. As is known, an emission control unit can also be separate from the engine control unit for ease of maintenance, diagnostic and repair. Additionally, the emission control unit (not shown) or the engine control unit (not shown) can be connected to the sensing device 258 of the first chamber 210.

When the engine 300 is running, a vacuum is generated in the intake manifold 310. The vacuum or negative pressure is communicated to the first chamber 210 through orifice portion 330 and the normally closed valve 256 to remove any air or fuel vapor in the first chamber 210. Concurrently, the first chamber 210 will experience a pressure drop that causes the flexible member 230 to collapse inwardly, forcing the fuel level to rise to a predetermined height. The predetermined height, according to a preferred embodiment, can be above the position of the sensing device 258 and at least at the same position as the normally closed valve 256 or the lip seals 254. It should be noted here that this height can be determined as a function of the size of the orifice portion 330, the bias on the normally closed valve 256 and the volume of fuel in the nozzle portion 250.

The inward movement of the flexible member 230 will also cause the pressure in the second chamber 220 to drop. By virtue of the throttled portion 273, however, air pressure in the second chamber 220 will tend to equalize with the ambient air pressure, leaving only the first chamber 210 under a vacuum or a negative pressure. Furthermore, as long as there is no leak in the first chamber 210, this negative pressure is maintained in the first chamber 210 even when the engine 300 is turned off.

Because the first chamber 210 is devoid of air, the formation of fuel vapor is believed to be eliminated. Since no fuel vapor is generated in the first chamber 210, there is no need for a charcoal vapor canister according to the preferred embodiments. Moreover, since the fuel is under a negative pressure, leaks anywhere in the first chamber 210 are believed to be prevented since the ambient pressure outside the first chamber 210 is higher than the pressure inside this chamber. Thus, outside air will rush in through the leaks (to equalize the pressure inside the first chamber 210) instead of leaking fuel outside the first chamber 210. In doing so, a failsafe feature is provided by the preferred embodiments.

Once the fuel level in the fuel tank drops (due to the equalization of pressure inside and outside the first chamber 210) to below the position of the sensing device 258, which is preferably a liquid-air sensor, the sensing device 258 indicates a leak to either the operator or a control unit (not shown). Alternatively, if the sensing device 258 also includes a pressure sensor, the sensing device 258 indicates a pressure drop and immediately notify the automobile operator (not shown) through a signaling device (not shown) or to a control unit (not shown) of a fuel tank leak.

Since the fuel tank or module 200 includes a minimal number of parts, it is contemplated that the fuel tank 200 can be assembled as a fuel module unit for installation on a vehicle assembly line. The fuel module unit would include the first and second chambers, (the second chamber 220 including the bleed valve portion and the normally closed valve) the flexible member 230, and the nozzle portion 250 (including the lip seals and the nozzle cap 252, the normally closed valve and the sensing device 258). The fuel module 200 can be a fully assembled unit prior to its installation on an assembly line. As such, it is believed that the installation would consist of mounting the fuel module 200 in a fuel compartment of the vehicle, attaching the vapor passage 320 to an intake manifold, connecting the sensing device 258 to the vehicle control unit and coupling fuel lines to the fuel pump 240.

Figure 3:
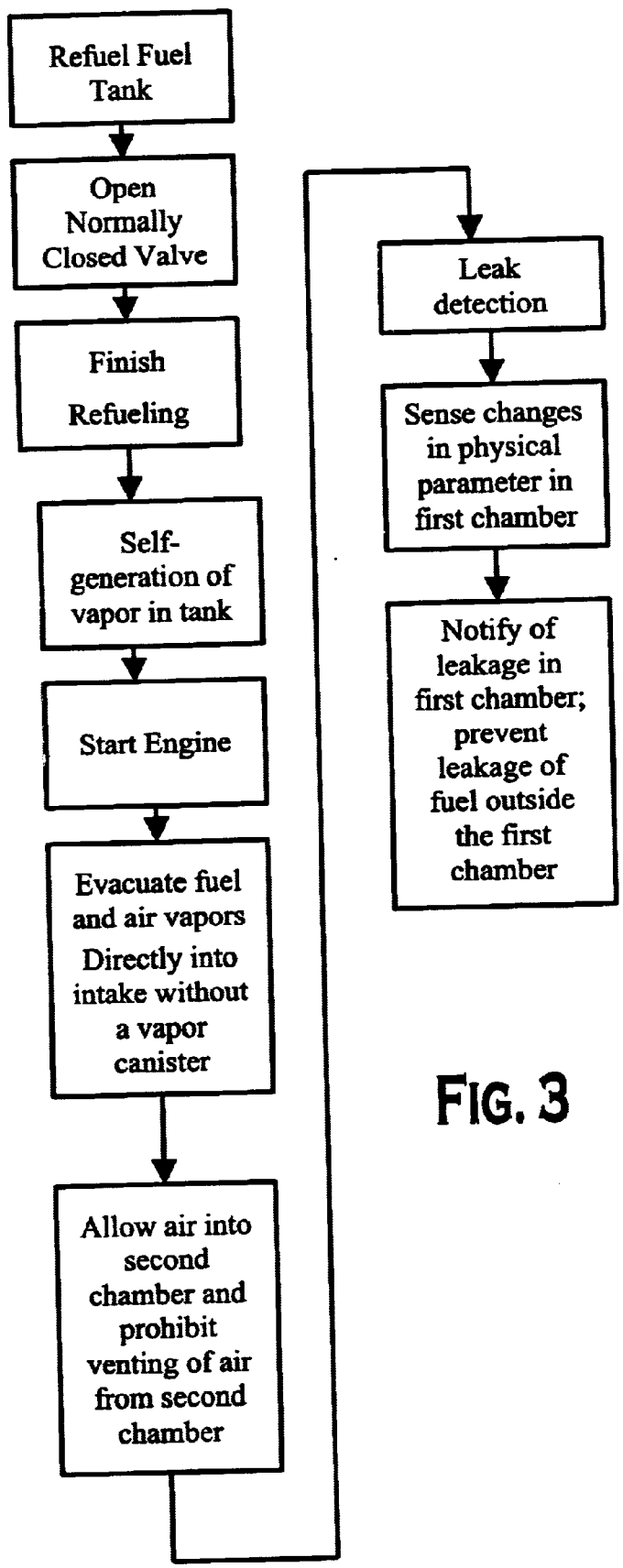
FIG. 3 is a flow chart of the operational process of the present invention.

Referring to FIG. 3, the process of determining fuel leak can be done subsequent to a refueling operation of the fuel tank 200 and the start of the engine 300. Once the engine 300 begins evacuating fuel and air vapors, the pressure inside the first chamber 210 also drops. This operation not only eliminates the use of a vapor canister, it allows for leak detection and failsafe operations should there be a leak.

Since liquid fuel is substantially incompressible, the fuel level will rise in the nozzle portion 250 when the pressure in the first chamber 210 is lowered. From this point on, any leaks in the first chamber 210 will cause the pressure or the fuel level in the first chamber 210 to drop. As provided, the sensing device 258 will immediately signal or notify an operator or a control unit of the leakage as inferred by a pressure drop, the absence of liquid or the presence of air. Simultaneously, fuel is prevented from leaking outside the first chamber 210.

Thus the preferred embodiments are believed to provide economical advantages and benefits to vehicle manufacturers. For example, due to the absence of air inside the fuel tank or module 200, leaks are believed to be reduced. Not only will the fuel tank or module 200 be safer, leak diagnostics in compliance with applicable governmental emission requirements can be done using just one sensing device. Additionally, the minimal number of parts of the preferred embodiments allows the packaging of vapor recovery, leak detection and leak prevention in a single module that can be quickly assembled (or retrofitted) to any types of automobile to bring the automobile into compliance with applicable emission regulations. Finally, cost savings are realized by the elimination of the vapor canister, one or more purge solenoids, one or more hydrocarbon sensors and other sensors in the manufacture of an automobile.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A fuel delivery system to an internal combustion engine, the system comprising:
   an internal combustion engine having a control unit;
   a fuel tank;
   a flexible membrane being disposed within the fuel tank, the membrane separating a first chamber and a second chamber;
   a fuel pump being coupled to one of the first and second chambers, the fuel pump adapted to supply fuel to the internal combustion engine;
   a first valve in communication with at least one of the first and second chambers, the first valve assembly adapted to vent air from one of the first and second chambers when fuel is pumped into or out of the fuel tank;
   a second valve in communication with the other one of the first and second chambers, the second valve adapted to purge air and fuel vapors without a charcoal canister during an operation of the engine; and
   a sensor being disposed within one of the first and second chambers and adapted to be connected to the control unit, wherein the sensor is responsive to the presence of air in one of the first and second chambers.

2. A fuel delivery system as claimed in claim 1, wherein the second valve is closed when the engine is not in operation.

3. A fuel storage module, comprising:
   a first container with at least one open end;
   a second container with at least one open end;
   a flexible membrane being disposed between the open ends of the respective first container and the second container;
   a fuel pump being coupled to one of the first and second containers;
   a first valve in communication with at least one of the first and second containers;
   a second valve in communication with the other one of the first and second containers and, the second valve not in communication with a charcoal vapor canister; and
   a sensor being disposed within one of the first and second containers, wherein the sensor senses the presence of air in one of the containers.

4. The fuel storage module according to claim 3, further comprising a fuel nozzle portion and a fuel nozzle cap, wherein the sensor is disposed at least within the fuel nozzle portion.

5. The fuel storage module according to claim 4, wherein the fuel nozzle portion includes at least one lip seal disposed on an end of the fuel nozzle portion.

6. A fuel vapor control system for an internal combustion engine, the system comprising:
   a fuel tank;
   a flexible member being disposed within the fuel tank, the member separating a first compartment and a second compartment;
   a fuel pump coupled to one of the first and second compartments;
   a first valve communicating with at least one of the first and second chambers;
   a second valve communicating with the other one of the first and second chambers and in further communication with a vacuum source, the second valve not in communication with a vapor canister; and a
   sensor being disposed within one of the first and second chambers, wherein the sensor is a liquid-air discriminator.

7. The fuel vapor control system as claimed in claim 6, wherein the second valve is operative upon an operation of the engine to permit the communication of the other one of the first and second chambers with an intake of an internal combustion engine.

8. A fuel vapor control system for an internal combustion engine, the system comprising:

a fuel tank;

a flexible member being disposed within the fuel tank, the member separating a first compartment and a second compartment;

a fuel pump coupled to one of the first and second compartments;

a first valve communicating with at least one of the first and second chambers;

a second valve communicating with the other one of the first and second chambers and in further communication with a vacuum source, the second valve not in communication with a vapor canister; and a sensor being disposed within one of the first and second chambers, wherein the sensor is a liquid-air discriminator;

wherein the second valve is responsive to an operation of the sensor in the presence of one of air or liquid fuel.

9. A method of determining leaks in a fuel tank, the method comprising:

providing fuel in a fuel storage volume substantially devoid of air; and detecting an entry of air in the fuel storage volume.

10. A method of determining leaks in a fuel tank, the method comprising:

providing fuel in a fuel storage volume substantially devoid of air; and detecting an entry of air in the fuel storage volume, the detecting including sensing an increase in a pressure of the fuel storage volume.

11. The method according to claim 9, wherein the detecting includes sensing the presence of air in the fuel storage volume.

12. A method of determining leaks in a fuel tank, the method comprising:

providing fuel in a fuel storage volume substantially devoid of air, the providing including supplying fuel to the fuel storage volume and purging air and fuel vapor in the storage volume with a vacuum source; and detecting an entry of air in the fuel storage volume, the detecting including inferring the entry of air by the absence of fuel in a portion of the fuel storage volume.

13. A method of operating a fuel vapor purge system, the vapor system including fuel storage chamber and an air chamber of a fuel tank, the method comprising:

providing fuel to the storage chamber to allow the formation of fuel vapors in the fuel storage chamber;

expelling air and fuel vapors in the storage chamber without communicating to a vapor canister; and detecting the entry of air into the fuel storage chamber.

14. The method according to claim 13, wherein the providing includes causing fuel to flow from a fuel source to the fuel storage chamber while permitting air to vent from the air chamber.

15. The method according to claim 13, wherein the expelling includes selectively exhausting air and fuel vapor in the fuel storage chamber to an internal combustion engine.

16. The method according to claim 13, wherein the detecting includes sensing the presence of air in the fuel storage chamber.

17. The method according to claim 13, wherein the detecting includes sensing an increase in pressure in the fuel storage chamber.

18. The method according to claim 13, wherein the detecting includes inferring the entry of air by the absence of fuel in a portion of the fuel storage chamber.

* * * * *